June 19, 1928.
A. KADOW ET AL
1,674,366
PROCESS OF MANUFACTURING GLASS
Filed April 7, 1924
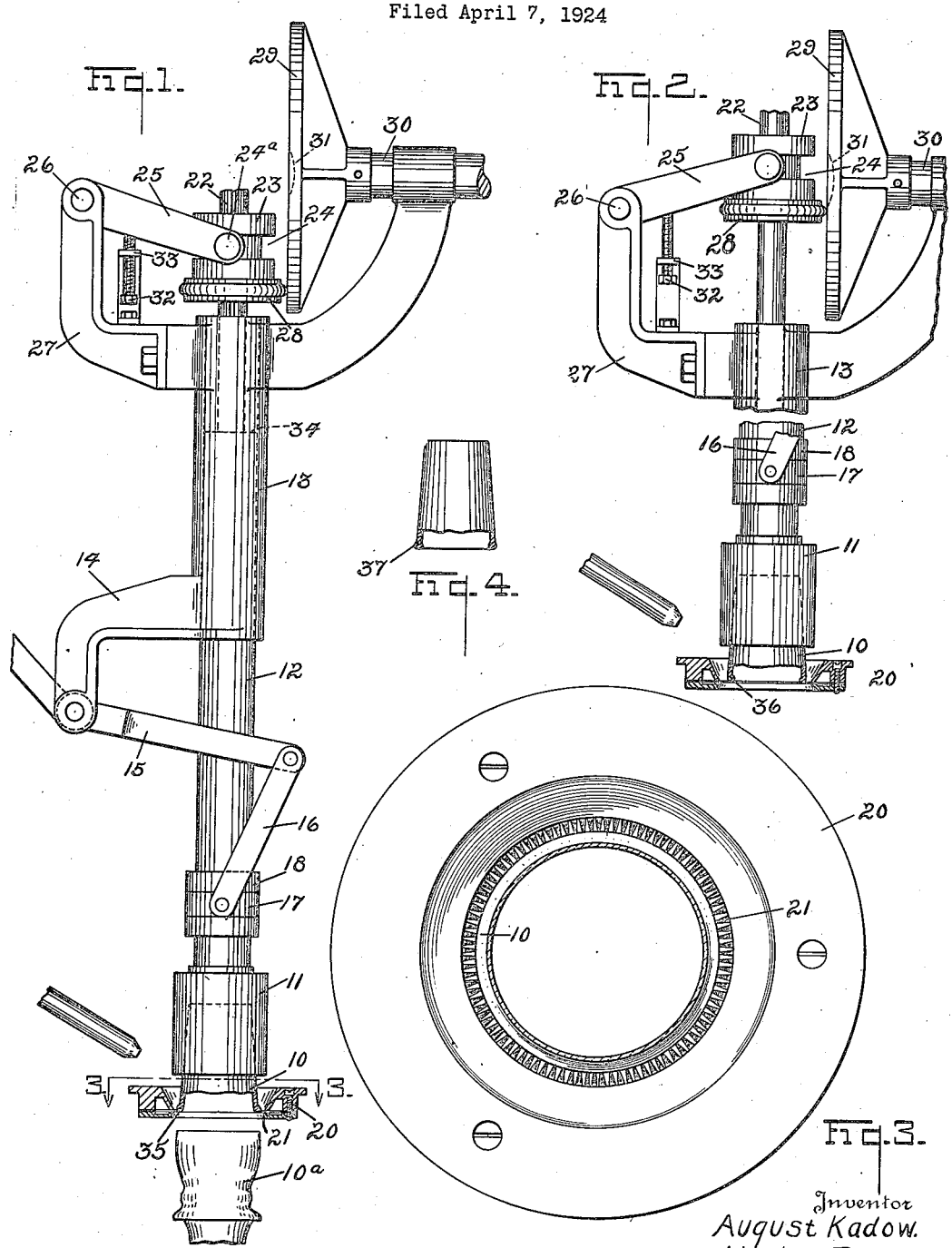
Inventor
August Kadow.
Alvah C. Parker.
By Owen, Owen & Crampton
Attorneys Patented June 19, 1928.

1,674,366

UNITED STATES PATENT OFFICE.

AUGUST KADOW AND ALVAH C. PARKER, OF TOLEDO, OHIO, ASSIGNORS TO THE LIBBEY GLASS MANUFACTURING COMPANY, OF TOLEDO, OHIO, A CORPORATION OF OHIO.

PROCESS OF MANUFACTURING GLASS.

Application filed April 7, 1924. Serial No. 704,571.

Our invention relates to severing glass and forming a finished edge along the line of severance.

The object of our invention is to provide a method whereby glassware may be accurately and economically severed, and a finished edge produced along the line of severance.

In manufacturing open-mouthed, thin-walled blown glassware, which is blown with moil attached, it is customary to crack off the moil by scratching the glass along the desired line of severance and then applying heat, the change in temperature causing the glass to crack along the desired line. After this, the edge of the glass is ground in order to smooth it, then the article is washed and dried and subjected to fire-polishing in order to round and polish the ground edge. This cracking-off and fire-polishing process is expensive, as it requires excessive amounts of hand work, factory space and time.

It is old also to sever glass by heating it along the desired line of severance and drawing it apart until it parts along that line, but so far as we are aware this has always been accompanied by drawing out the molten edge of the glassware. In some cases, as in melting tubes in two for forming vials, the molten glass along the line of severance has been allowed to draw in by surface tension, and has been formed into bottoms or necks by the application of suitable appliances.

It is old also to sever the moil from lamp bulbs by melting the glass along the desired line of severance, but it is customary in such cases to use burners which do not sever the glass quickly enough to prevent deformation of the adjacent walls, so that generally a film of molten glass is formed across the neck and various means are used to avoid or break this film, or to flare the molten glass adjacent the line of severance.

We have discovered that by subjecting the line of severance to an intense heat, as by applying a continuous or substantially continuous flame to the line of severance and positioning the burner and article so that the hottest point of the flame contacts the glass, it is possible to melt the glass along the line of severance without heating the adjacent walls of the article so much that they will be deformed.

When melting off glass having forms of rotation, we use a continuous or substantially continuous annular flame, such as may be created by using a great number of closely adjacent jets. In order to avoid any difference in the amount of heat applied to various portions of the line of severance, relative rotation between the burner and the article is desirable.

We will now describe our process as applied to burning-off the moil from a blown tumbler, reference being had to the accompanying drawings, in which—

Figure 1 is a diagrammatic illustration of apparatus suitable for carrying out our process; Fig. 2 is a diagrammatic view of portions of the same apparatus in different positions; Fig. 3 is a sectional view on the line 3—3 of Fig. 1, and Fig. 4 is a view of a finished article.

In the aparatus which we have shown diagrammatically, the tumbler 10 with its attached moil $10^a$ is supported in a chuck 11, which is carried by a sleeve 12, journaled in a bearing 13. From the lower end of the bearing 13 there is a projecting arm 14, to which is pivoted a lever 15. The lever 15 is connected by a link 16 to a collar 17, which is positioned in a groove in a collar 18 fastened to the sleeve 12. In this way, the sleeve and the chuck carried thereby may be raised and lowered, as desired.

A burner 20 is shown in position to surround the desired line of severance of an article in the lowered chuck. The burner shown is adapted to produce a great number of small jets 21, as indicated in Fig. 3, and the distance between the burner and the glass is such that the hottest point of the flame produced by each of these jets contacts the glass.

In the construction shown, the sleeve is rotated by a shaft 22, which is splined within a collar 23. The collar 23 has a groove 24 in which plays a stud $24^a$ in the end of a link 25 pivoted at 26 to an arm 27 projecting from the upper end of the bearing 13. Fixed to the lower side of the collar 23 is a friction wheel 28, which is adapted to contact the face of a friction wheel 29. The friction wheel 29 is carried by a shaft 30, driven from any suitable source of power. The central portion of the wheel 29 is cut away as indicated by dotted line 31. A set screw 32 passes through a lug 33, projecting from the arm 27. The set screw 32 is in position to stop the link 25 when the wheel 28 is lowered the desired amount.

The method of carrying out our process with the above described apparatus is as follows:—

The chuck is raised by means of the lever 15. The top of the sleeve 12, indicated in Figure 1 by a dotted line at 34, contacts the wheel 28 and raises it until it is opposite the center of the shaft 30, and so rotation of the chuck ceases. An article with its moil attached is then placed in the chuck and the chuck lowered to properly position the article within the burner.

The friction wheel 28 follows the sleeve 12 downward until the link 25 contacts the screw 32. As the periphery of wheel 28 contacts the friction surface of wheel 29, rotation is transmitted to the chuck. The speed of rotation increases as the wheel 28 is lowered towards the periphery of wheel 29. When the wheel 28 is lowered to a position, such as shown in Fig. 1, the rotation of the chuck will be comparatively rapid, whereas if the wheel 28 is stopped in the position shown in Fig. 2, the rotation will be comparatively slow.

The article is rotated within the flame until it is melted along the desired line of severance and the moil drops away. The flame may be continued for a time after the moil drops away with either the same or lessened intensity, in order to form the desired edge on the finished article.

It is inevitable that a portion of the glass along the line of severance becomes melted and remains attached to the severed edge. Surface tension tends to cause this glass to assume a rounded form. In ordinary operation, there is sufficient glass melted so that this round edge will assume the form of a thickened bead, and this result we have found to be generally desirable.

The position and shape of this bead depends upon a number of inter-acting forces. Surface tension tends to give the bead a circular form in cross-section, gravity tends to lengthen the vertical diameter of this circle and to shorten the horizontal diameter, and the force of the moving gases of the flame and centrifugal force tend to lengthen the horizontal diameter and shorten the vertical diameter.

By decreasing the force of the flame during the bead shaping stage and correspondingly reducing the speed of rotation, gravity may be allowed to stretch the bead vertically so that the edge of the glass will not be materially thickened. The comparative effect of gravity may be lessened by increasing the force of the flame and the speed of rotation, and the force which gravity exerts towards drawing out the bead might be gradually reduced by inclining the axis of rotation, and, by continuing this change in the direction of the axis through the horizontal position until the moil is directed upward, gravity may be used to assist in flattening the bead, if desired. If the article is rotated with comparative rapidity, as indicated in Fig. 1, without corresponding increase in the force of the flame, the bead will be thrown outward as at 35. If the rotation of the article is comparatively slow, as indicated in Fig. 2, without a corresponding reduction in the force of the flame, the bead will project inward as shown at 36. We prefer to balance the forces and form a symmetrical bead, as shown at 37 in Fig. 4.

From the above, it will be apparent that we can shape and position the bead substantially as desired by governing the various forces in the manner described.

Where the severing step is not needed, it is still possible to form a bead on the edge of a glass article by melting the glass along the edge and governing the formation of the bead in the manner described, but where the glass is to be severed, it is advantageous to form the bead as a part of the melting off process.

As will be seen, we have provided a process by which glassware may be quickly and economically severed, and by which the severed edge may be finished in a useful and attractive manner.

The apparatus herein diagrammatically shown may be varied, as desired, to carry out the steps of our process, and the process may be varied within the scope of the appended claims without departing from the spirit of the invention.

What we claim is:

1. The process of severing glass and forming on a glass article an edge that is exposed during the normal use of the article, which consists in melting the glass along the line of severance so quickly that severance results and leaves the glass constituting the exposed edge of the finished article in exactly its original position with regard to the portion of the said article to which it is attached, except for a small amount of glass which is melted and forms a bead along said edge.

2. The process of severing glass articles having forms of rotation, which consists in applying to the walls of such an article a substantially annular flame of sufficient intensity to melt off the article along the desired line of severance and form a severed edge along that line.

3. The process of severing glass articles having forms of rotation, which consists in applying to the walls of such an article a substantially annular flame of sufficient intensity to melt off the article along the desired line of severance and form a severed edge along that line, and rotating the article relatively to the flame during the melting period.

4. The process of severing the moil from a blown glass article, which consists in positioning the article with the moil downward, applying a substantially continuous flame to the entire desired line of severance of sufficient intensity to melt the glass in two and leave a severed edge along said line.

5. The process of severing glass, which consists in applying a substantially continuous flame to the entire line of desired severance, the flame being of such intensity that it melts the glass along the line of severance and leaves a severed edge along said line, and forming the melted glass remaining on the edge into a rounded bead.

6. The process of severing the moil from a blown glass receptacle, which consists in positioning the receptacle with the moil down, applying a substantially annular flame to the desired line of severance of sufficient intensity to melt off the moil and leave a severed edge along said line, and forming the melted glass remaining on the severed edge into a rounded bead.

7. In the manufacture of glassware, the process which consists in forming a set shape from molten glass, thereafter melting the shape along a line of severance which will give final form to the desired article, rotating the article, forming a bead along the melted edge, and governing the speed of rotation to position the bead as desired.

8. In the manufacture of glassware, the process which consists in blowing an article, dividing it on a plane normal to its axis by impinging a melting flame upon the glass at that plane of sufficient intensity to melt the glass and leave a severed edge along said line, forming a bead along the edge during the melting off process, and governing the position of the bead by controlling the force exerted thereon by the melting flame.

9. In the manufacture of glassware, the process which consists in melting off a glass article by rotating the article while impinging a flame thereon, forming a bead on the severed edge of the article during the melting off process, and governing the position of the bead by regulating the force of the flame and the centrifugal force resulting from the rotation of the article.

10. The process of forming a bead on the edge of hollow glassware, which consists in playing a flame across the edge toward the center of the article while rotating the article, and regulating the speed of rotation and the force of the flame so as to position the bead as desired.

11. The process of forming a bead on the edge of a hollow glass article, which consists in melting the glass on the edge of the article and controlling the position of such molten glass by centrifugal force.

12. The process of forming a bead on the edge of a glass article, which consists in positioning the article with its edge downward, melting the glass along said edge and applying centrifugal force to modify the shape which surface tension and gravity would give to the resulting bead.

13. The process of forming a bead on a glass article, which consists in melting glass along the edge of the article and controlling the position of such molten glass by moving gases.

14. The process of forming a bead on a glass article, which consists in positioning the article with its edge downward, melting the glass along said edge, and applying moving gases to modify the shape which surface tension and gravity tend to give the resulting bead.

In testimony whereof we have hereunto signed our names to this specification.

AUGUST KADOW.
ALVAH C. PARKER.